US012146635B2

(12) United States Patent
Zubaj et al.

(10) Patent No.: US 12,146,635 B2
(45) Date of Patent: Nov. 19, 2024

(54) LIGHTING DEVICE FOR A VEHICLE HEADLAMP

(71) Applicant: ZKW Group GmbH, Wieselburg (AT)

(72) Inventors: Andrej Zubaj, Krnca (SK); Robert Gutten, Prusy (SK)

(73) Assignee: ZKW Group GmbH, Wieselburg (AT)

( * ) Notice: Subject to any disclaimer, the term of this patent is extended or adjusted under 35 U.S.C. 154(b) by 143 days.

(21) Appl. No.: 17/907,786

(22) PCT Filed: Feb. 16, 2021

(86) PCT No.: PCT/EP2021/053739
§ 371 (c)(1),
(2) Date: Aug. 29, 2022

(87) PCT Pub. No.: WO2021/175576
PCT Pub. Date: Sep. 10, 2021

(65) Prior Publication Data
US 2023/0147387 A1    May 11, 2023

(30) Foreign Application Priority Data
Mar. 2, 2020  (EP) .................................. 20160423

(51) Int. Cl.
*B60Q 1/04* (2006.01)
*F21S 45/33* (2018.01)
(Continued)

(52) U.S. Cl.
CPC ............ *F21S 45/33* (2018.01); *B60Q 1/0441* (2013.01); *F21S 45/42* (2018.01); *F21S 45/49* (2018.01)

(58) Field of Classification Search
CPC ...... B60Q 1/04; B60Q 1/0433; B60Q 1/0441; F21S 45/00; F21S 45/33; F21S 45/40;
(Continued)

(56) References Cited

U.S. PATENT DOCUMENTS

| 11,378,243 B2 * | 7/2022 | Artner ..................... F21S 41/19 |
| 2004/0041984 A1 * | 3/2004 | Tani ....................... G03B 27/54 353/20 |

(Continued)

FOREIGN PATENT DOCUMENTS

| CN | 208794309 U | * | 4/2019 |
| DE | 102010045899 B3 | | 2/2012 |
| DE | 102014117325 A1 | | 6/2016 |

OTHER PUBLICATIONS

International Search Report for PCT/EP2021/053739, dated May 6, 2021 (12 pages).
(Continued)

Primary Examiner — Thai Pham
(74) Attorney, Agent, or Firm — Eversheds Sutherland (US) LLP

(57) ABSTRACT

A lighting device (10) for a vehicle headlamp, comprising: —a light module (50), —a fan (100) configured to dissipate heat produced by the light module (50), —a support frame (70) configured to hold the light module (50), wherein the support frame (70) comprises a securing device (200) which is disposed on the support frame (70), wherein the securing device (200) is configured to secure the fan (100) in an end position (P2) on the securing device (200), wherein the securing device (200) comprises a protrusion (210) extending along an axis (Z) and a first fastening-element (220), wherein the fan (100) comprises an engaging-opening (110), and a second fastening-element (120), wherein the securing device (200) is arranged in a way, that allows the fan (100) to be brought into an intermediate position (P1) by inserting the engaging-opening (110) onto the protrusion (210), such that the fan (100) is mounted pivotable around the axis (Z) on the securing device (200), wherein the securing device (200) is arranged in a way, that allows the fan (100) to be brought into the end position (P2)
(Continued)

Figure 1:
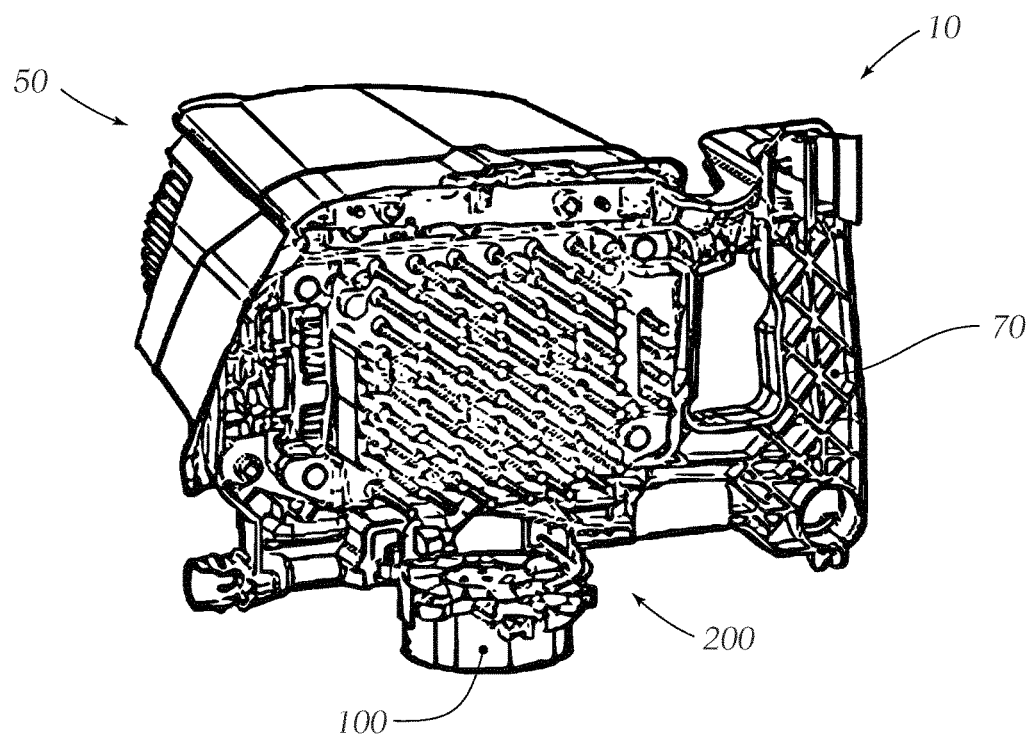

by rotating the fan (100) starting from the intermediate position (PI) around the axis (Z), such that the second fastening-element (120) engages with the first fastening-element (220) to secure the fan (100) in the end position (P2).

13 Claims, 3 Drawing Sheets

(51) Int. Cl.
    *F21S 45/40*     (2018.01)
    *F21S 45/42*     (2018.01)
    *F21S 45/49*     (2018.01)

(58) Field of Classification Search
    CPC ........... F21S 45/42; F21S 45/49; F21V 29/50; F21V 29/67; F21V 29/70

See application file for complete search history.

(56) References Cited

U.S. PATENT DOCUMENTS

| | | | |
|---|---|---|---|
| 2009/0154189 A1* | 6/2009 | Cho | F21S 45/49 |
| | | | 362/547 |
| 2011/0128752 A1* | 6/2011 | Herbers | F21S 45/43 |
| | | | 362/547 |
| 2014/0022807 A1 | 1/2014 | Watanabe et al. | |
| 2014/0186178 A1* | 7/2014 | Willeke | F21V 29/60 |
| | | | 416/5 |
| 2014/0293625 A1* | 10/2014 | Sato | F21V 29/78 |
| | | | 362/382 |
| 2014/0328079 A1* | 11/2014 | Itagaki | F21S 41/192 |
| | | | 362/547 |
| 2014/0340922 A1 | 11/2014 | Matsumoto | |
| 2018/0335054 A1* | 11/2018 | Scholz | B60Q 1/00 |

OTHER PUBLICATIONS

Search Report for European Patent Application No. 20160423.8 dated Oct. 5, 2020 (5 pages).

* cited by examiner

LIGHTING DEVICE FOR A VEHICLE HEADLAMP

The invention relates to a lighting device for a vehicle headlamp, comprising:
- a light module, configured to emit a light distribution,
- a fan configured to dissipate heat produced by the light module, when the fan is in an end position,
- a support frame configured to hold the light module, wherein the support frame comprises a securing device which is disposed on the support frame, wherein the securing device is configured to secure the fan in the end position on the securing device.

Further, the invention relates to a vehicle headlamp comprising at least one lighting device according to the invention.

Further, the invention relates to a method for assembling of a lighting device.

In the state of the art, the fan is secured in conventionally assemblies by screw connections or clamping with use of additional parts. The leads to a significant effort with regard to the securing of the fan in a desired position.

It is an object of the invention to provide an enhanced lighting device.

To achieve this object, the securing device comprises a protrusion extending along an axis and a first fastening-element, wherein
- the fan comprises an engaging-opening corresponding to the protrusion of the securing device, and a second fastening-element corresponding to the first fastening-element of the securing device,
- wherein the securing device is arranged in a way, that allows the fan to be brought into an intermediate position on the securing device by inserting the engaging-opening of the fan onto the protrusion, such that the fan is mounted pivotable around the axis on the securing device,
- wherein the securing device is arranged in a way, that allows the fan to be brought into the end position on the securing device by rotating the fan starting from the intermediate position around the axis, such that the second fastening-element of the fan engages with the first fastening-element of the securing device to secure the fan in the end position.

As a result of this solution, a reliable locking and centering system for the fan on the support frame of the lighting device is provided, which ensures an accurate positioning in relation to the light module.

Advantageously, the securing device comprises a guide section built as a groove, which extends orthogonal to the axis, and the fan comprises a guiding-element corresponding to the groove, wherein the groove is configured to receive the guiding-element, when the fan is brought into the end position starting from the intermediate position, such that the guiding-element in combination with the groove lead the fan into the end position.

Advantageously, the securing device comprises a first abutment-portion, wherein the fan abuts on the first abutment-portion when the fan is brought into the end position in order to limit the pivot movement of the fan around the axis.

Advantageously, the securing device comprises a second abutment-portion configured to limit a movement of the fan along the axis when the fan is in the end position.

Advantageously, the first fastening-element of the securing device is built as latching-element, wherein the second fastening-element of the fan is built as a counter latching-element.

Advantageously, the first fastening-element of the securing device is built as a detent lug and the second fastening-element is built as a rigid protrusion, wherein the rigid protrusion snaps in the detent lug, when the fan is brought into the end position.

Advantageously, the support frame and the securing device are made of an integral piece of material, preferably made of one material.

The object of the invention is also achieved by a vehicle headlamp comprising at least one lighting device.

The object of the invention is also achieved by a method for assembling of a lighting device, comprising the following steps in chronological order:
a) providing
- a light module, configured to produce a light distribution,
- a fan configured to dissipate heat produced by the light module, when the fan is in an end position,
- a support frame configured to hold the light module, wherein the support frame comprises a securing device which is disposed on the support frame, wherein the securing device is configured to secure the fan in the end position on the securing device, wherein the securing device comprises a protrusion extending along an axis and a first fastening-element, wherein the fan comprises an engaging-opening corresponding to the protrusion of the securing device, and a second fastening-element corresponding to the first fastening-element of the securing device,
b) bringing the fan into an intermediate position by inserting the engaging-opening onto the protrusion, such that the fan is mounted pivotable around the axis on the securing device,
c) bringing the fan into the end position by rotating the fan starting from the intermediate position around the axis, such that the second fastening-element of the fan engages with the first fastening-element of the securing device to secure the fan in the end position.

Advantageously, the securing device comprises a guide section built as a groove, which extends orthogonal to the axis, and the fan comprises a guiding-element corresponding to the groove, wherein the groove is configured to receive the guiding-element, when the fan is brought into the end position starting from the intermediate position, such that the guiding-element in combination with the groove lead the fan into the end position.

Advantageously, the securing device comprises a first abutment-portion, wherein the fan abuts on the first abutment-portion when the fan is brought into the end position in step c) in order to limit the pivot movement of the fan around the axis.

Advantageously, the securing device comprises a second abutment-portion configured to limit a movement of the fan along the axis when the fan is in the end position.

Figure 2:
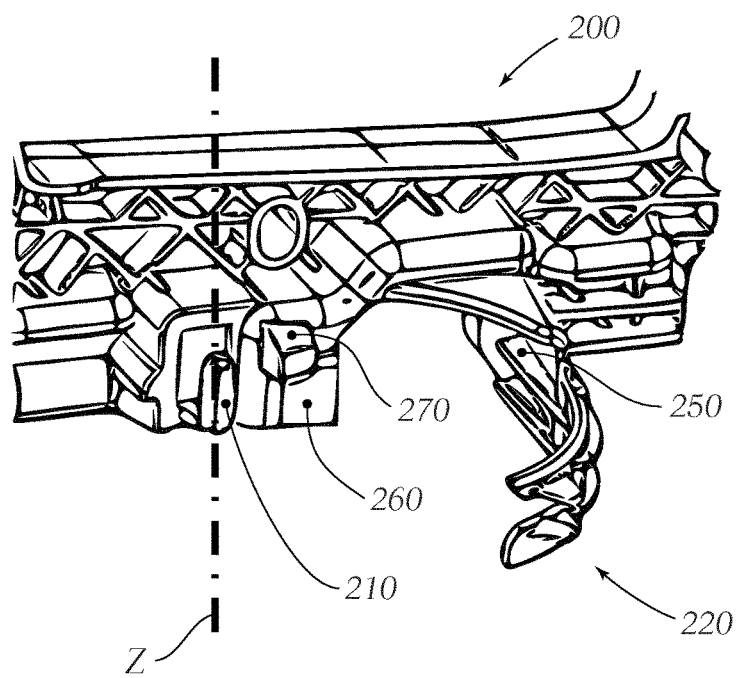
Figure 3:
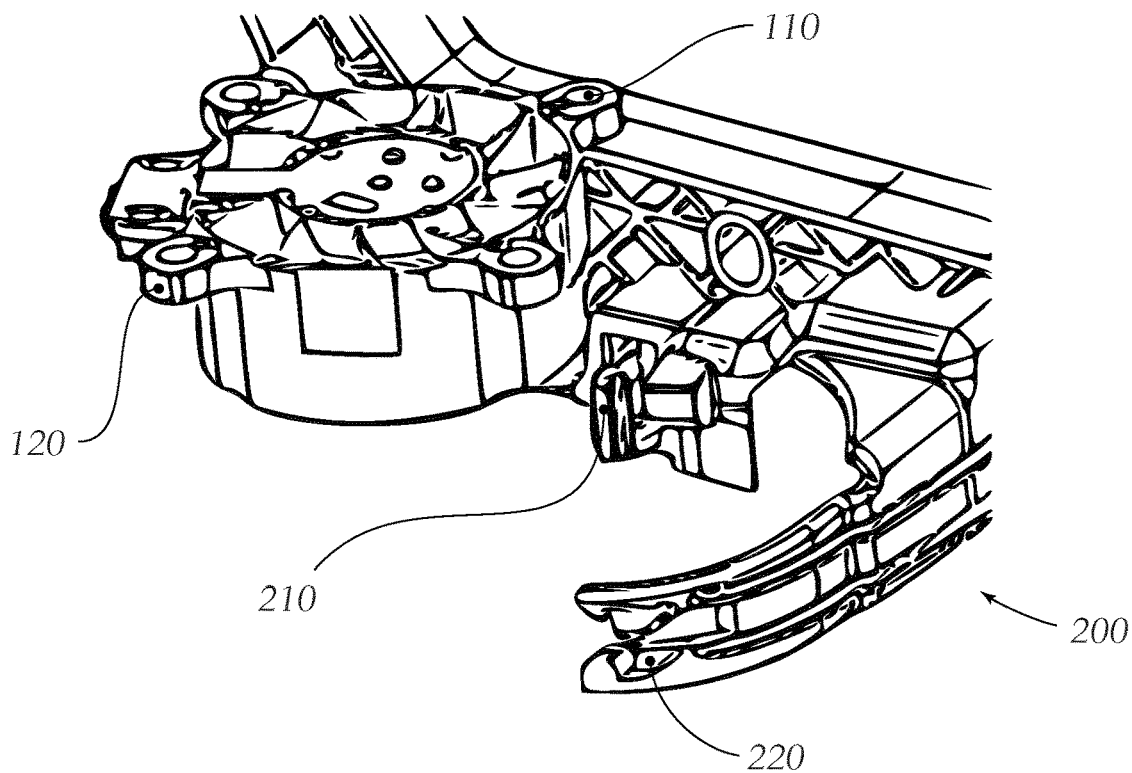
Figure 4:
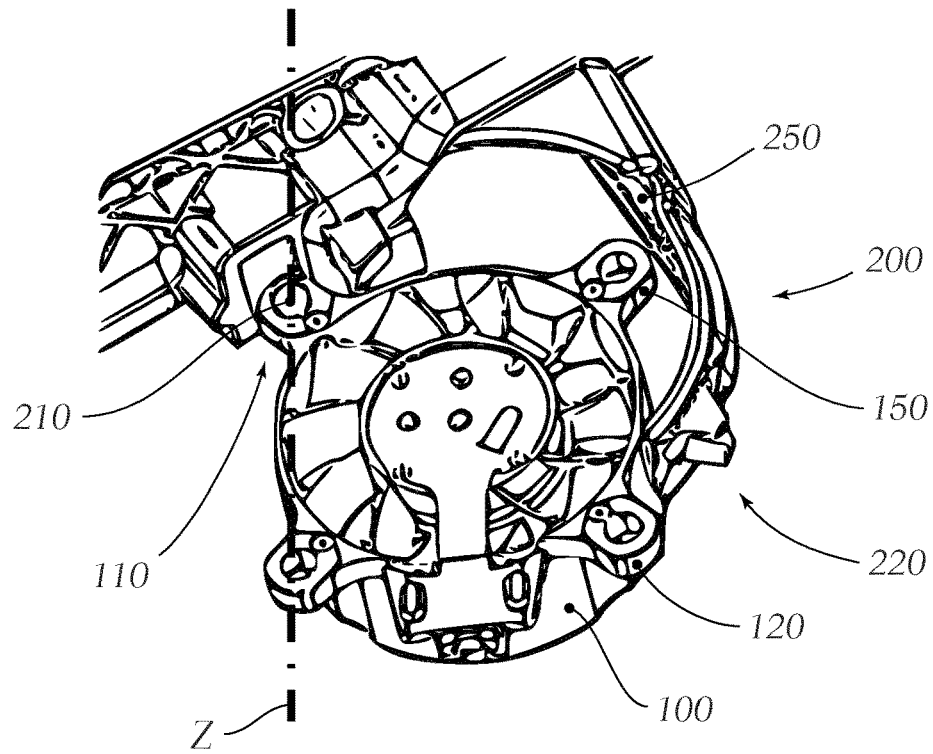
Figure 5:
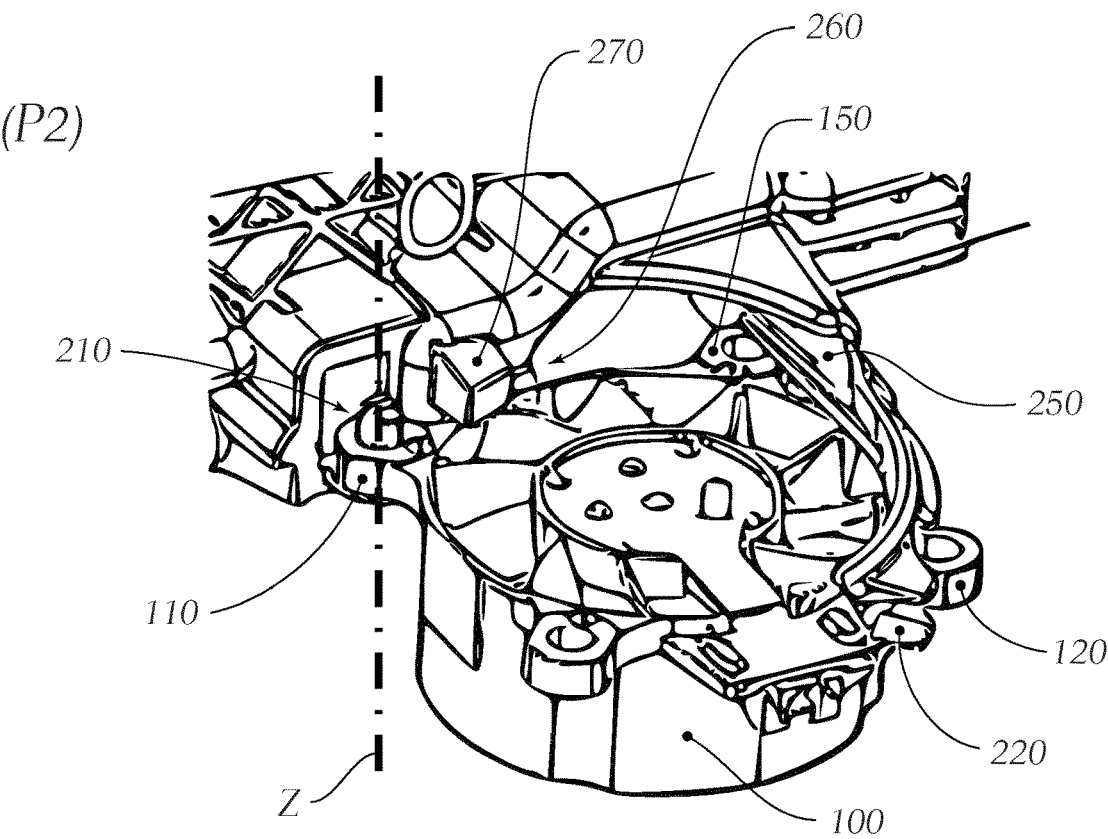
Figure 6:
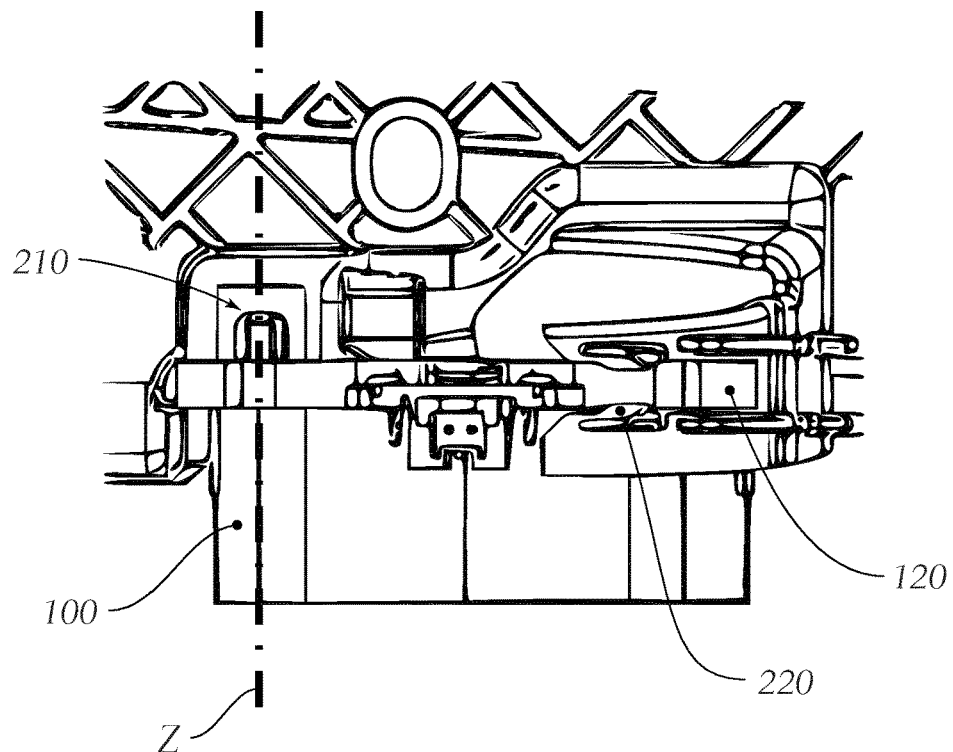

In the following, in order to further demonstrate the present invention, illustrative and non-restrictive embodiments are discussed, as shown in the drawings, which show:

FIG. 1 a perspective view of an example of a lighting device with a light module, a securing device disposed on a support frame and fan, wherein the fan is in an end position on the securing device, FIG. 2 a detailed perspective view of the securing device of FIG. 1, FIG. 3 a detailed perspective view of the securing device and the fan, FIG. 4 an intermediate position of the fan on the securing device, FIG. 5 the end position of the fan on the securing device in a perspective view, and FIG. 6 the end position of the fan on the securing device in a side view.

FIG. 1 shows a lighting device 10 for a vehicle headlamp, comprising a light module 50, configured to emit a light distribution, a fan 100 configured to dissipate heat produced by the light module 50, when the fan 100 is in an end position P2, and a support frame 70 configured to hold the light module 50.

The support frame 70 comprises a securing device 200 which is disposed on the support frame 70, wherein the securing device 200 is configured to secure the fan 100 in the end position P2 on the securing device 200. The securing device 200 comprises a protrusion 210 extending along an axis Z and a first fastening-element 220, as can be seen in FIG. 2, which shows a detailed perspective view of the securing device 200. Further, the support frame 70 and the securing device 200, and all of the components of the securing device 200, are made of an integral piece of material, preferably made of one material.

The fan 100 comprises an engaging-opening 110 corresponding to the protrusion 210 of the securing device 200, and a second fastening-element 120 corresponding to the first fastening-element 220 of the securing device 200, which can be seen in FIG. 3, which shows the fan 100 and the securing device 200 in a perspective view.

Further, the securing device 200 is arranged in a way, that allows the fan 100 to be brought into an intermediate position P1 on the securing device 200 by inserting the engaging-opening 110 of the fan 100 onto the protrusion 210, such that the fan 100 is mounted pivotable around the axis Z on the securing device 200, which is illustrated in FIG. 4.

Referring to FIG. 5, the securing device 200 is arranged in a way, that allows the fan 100 to be brought into the end position P2 on the securing device 200 by rotating the fan 100 starting from the intermediate position P1 (shown in FIG. 4) around the axis Z, such that the second fastening-element 120 of the fan 100 engages with the first fastening-element 220 of the securing device 200 to secure the fan 100 in the end position P2. Also, the securing device 200 comprises a guide section built as a groove 250, which extends orthogonal to the axis Z, and the fan 100 comprises a guiding-element 150 corresponding to the groove 250, wherein the groove 250 is configured to receive the guiding-element 150, when the fan 100 is brought into the end position P2 starting from the intermediate position P1, such that the guiding-element 150 in combination with the groove 250 lead the fan 100 into the end position P2, as shown in FIGS. 4 and 5.

Further, the securing device 200 comprises a first abutment-portion 260, wherein the fan 100 abuts on the first abutment-portion 260 when the fan 100 is brought into the end position P2 in order to limit the pivot movement of the fan 100 around the axis Z, which can be seen in FIG. 5. Moreover, the securing device 200 comprises a second abutment-portion 270 configured to limit a movement of the fan 100 along the axis Z when the fan 100 is in the end position P2.

FIG. 6 shows the fan 100 in the end position P2 on the securing device 200 in a side view, wherein the first fastening-element 220, which is built as a detent lug, and the second fastening-element 120 of the fan 100, which is built as a rigid protrusion, can be seen in detail, wherein the rigid protrusion snaps in the detent lug, when the fan 100 obtained the end position P2 on the securing device 200.

LIST OF REFERENCE SIGNS

Lighting device . . . 10
Light module . . . 50
Support frame . . . 70
Fan . . . 100
Engaging-opening . . . 110
Second fastening-element . . . 120
Guiding-element . . . 150
Securing device . . . 200
Protrusion . . . 210
First fastening-element . . . 220
Groove . . . 250
First abutment-portion . . . 260
Second abutment-portion . . . 270
Axis . . . Z

The invention claimed is:

1. A lighting device (10) for a vehicle headlamp, comprising:
   a light module (50) configured to emit a light distribution;
   a fan (100) configured to dissipate heat produced by the light module (50) when the fan (100) is in an end position (P2);
   a support frame (70) configured to hold the light module (50), wherein the support frame (70) comprises a securing device (200) which is disposed on the support frame (70), wherein the securing device (200) is configured to secure the fan (100) in the end position (P2) on the securing device (200),
   wherein the securing device (200) comprises a protrusion (210) extending along an axis (Z) and a first fastening-element (220),
   wherein the fan (100) comprises an engaging-opening (110) corresponding to the protrusion (210) of the securing device (200), and a second fastening-element (120) corresponding to the first fastening-element (220) of the securing device (200),
   wherein the securing device (200) is arranged in a way, that allows the fan (100) to be brought into an intermediate position (P1) on the securing device (200) by inserting the engaging-opening (110) of the fan (100) onto the protrusion (210), such that the fan (100) is mounted pivotable around the axis (Z) on the securing device (200),
   wherein the securing device (200) is arranged in a way, that allows the fan (100) to be brought into the end position (P2) on the securing device (200) by rotating the fan (100) starting from the intermediate position (P1) around the axis (Z), such that the second fastening-element (120) of the fan (100) engages with the first fastening-element (220) of the securing device (200) to secure the fan (100) in the end position (P2).

2. The lighting device according to claim 1, wherein the securing device (200) comprises a guide section built as a groove (250), which extends orthogonal to the axis (Z), and the fan (100) comprises a guiding-element (150) corresponding to the groove (250), wherein the groove (250) is configured to receive the guiding-element (150), when the fan (100) is brought into the end position (P2) starting from the intermediate position (P1), such that the guiding-element (150) in combination with the groove (250) lead the fan (100) into the end position (P2).

3. The lighting device according to claim 1, wherein the securing device (200) comprises a first abutment-portion (260), wherein the fan (100) abuts on the first abutment-portion (260) when the fan (100) is brought into the end position (P2) in order to limit the pivot movement of the fan (100) around the axis (Z).

4. The lighting device according to claim 1, wherein the securing device (200) comprises a second abutment-portion (270) configured to limit a movement of the fan (100) along the axis (Z) when the fan (100) is in the end position (P2).

5. The lighting device according to claim 1, wherein the first fastening-element (220) of the securing device (200) is built as latching-element, wherein the second fastening-element (120) of the fan (100) is built as a counter latching-element.

6. The lighting device according to claim 1, wherein the first fastening-element (220) of the securing device (200) is built as a detent lug and the second fastening-element (120) is built as a rigid protrusion, wherein the rigid protrusion snaps in the detent lug, when the fan (100) is brought into the end position (P2).

7. The lighting device according to claim 1, wherein the support frame (70) and the securing device (200) are made of an integral piece of material.

8. The lighting device according to claim 7, wherein the integral piece of material is made of one material.

9. A vehicle headlamp comprising at least one lighting device (10) according to claim 1.

10. A method for assembling of a lighting device (10), comprising the following steps in chronological order:
   a) providing:
      a light module (50) configured to produce a light distribution,
      a fan (100) configured to dissipate heat produced by the light module (50) when the fan (100) is in an end position (P2), and
      a support frame (70) configured to hold the light module (50), wherein the support frame (70) comprises a securing device (200) which is disposed on the support frame (70), wherein the securing device (200) is configured to secure the fan (100) in the end position (P2) on the securing device (200), wherein the securing device (200) comprises a protrusion (210) extending along an axis (Z) and a first fastening-element (220), wherein the fan (100) comprises an engaging-opening (110) corresponding to the protrusion (210) of the securing device (200), and a second fastening-element (120) corresponding to the first fastening-element (220) of the securing device (200);
   b) bringing the fan (100) into an intermediate position (P1) by inserting the engaging-opening (110) onto the protrusion (210), such that the fan (100) is mounted pivotable around the axis (Z) on the securing device (200); and
   c) bringing the fan (100) into the end position (P2) by rotating the fan (100) starting from the intermediate position (P1) around the axis (Z), such that the second fastening-element (120) of the fan (100) engages with the first fastening-element (220) of the securing device (200) to secure the fan (100) in the end position (P2).

11. The method according to claim 10, wherein the securing device (200) comprises a guide section built as a groove (250), which extends orthogonal to the axis (Z), and the fan (100) comprises a guiding-element (150) corresponding to the groove (250), wherein the groove (250) is configured to receive the guiding-element (150), when the fan (100) is brought into the end position (P2) starting from the intermediate position (P1), such that the guiding-element (150) in combination with the groove (250) lead the fan (100) into the end position (P2).

12. The method according to claim 10, wherein the securing device (200) comprises a first abutment-portion (260), wherein the fan (100) abuts on the first abutment-portion (260) when the fan (100) is brought into the end position (P2) in step c) in order to limit the pivot movement of the fan (100) around the axis (Z).

13. The method according to claim 10, wherein the securing device (200) comprises a second abutment-portion (270) configured to limit a movement of the fan (100) along the axis (Z) when the fan (100) is in the end position (P2).

* * * * *